United States Patent
Lee et al.

(10) Patent No.: US 11,522,256 B2
(45) Date of Patent: Dec. 6, 2022

(54) SECONDARY BATTERY

(71) Applicant: Samsung SDI Co., Ltd., Yongin-si (KR)

(72) Inventors: Hyun Soo Lee, Yongin-si (KR); Ho Jun Shin, Yongin-si (KR); Jun Min Choi, Yongin-si (KR); Sang Won Kim, Yongin-si (KR); Sang Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 259 days.

(21) Appl. No.: 16/796,699

(22) Filed: Feb. 20, 2020

(65) Prior Publication Data
US 2020/0303713 A1    Sep. 24, 2020

(30) Foreign Application Priority Data
Mar. 19, 2019    (KR) .................. 10-2019-0031255

(51) Int. Cl.
*H01M 50/531*    (2021.01)
*H01M 50/55*    (2021.01)
(Continued)

(52) U.S. Cl.
CPC .................. *H01M 50/531* (2021.01)

(58) Field of Classification Search
None
See application file for complete search history.

(56) References Cited

U.S. PATENT DOCUMENTS

| 8,440,334 B2 | 5/2013 | Kim |
| 9,196,890 B2 * | 11/2015 | Kim ............ H01M 50/543 |

(Continued)

FOREIGN PATENT DOCUMENTS

| CN | 102034952 A | 4/2011 |
| CN | 103490039 A | 1/2014 |

(Continued)

OTHER PUBLICATIONS

EPO Extended Search Report dated Jul. 7, 2020, for corresponding European Patent Application No. 20159799.4 (9 pages).
(Continued)

*Primary Examiner* — Cynthia H Kelly
*Assistant Examiner* — Julian Anthony
(74) *Attorney, Agent, or Firm* — Lewis Roca Rothgerber Christie LLP

(57) ABSTRACT

A secondary battery includes: an electrode assembly including a first electrode plate and a second electrode plate, and electrode uncoated portions protruding at opposite sides of the electrode assembly, a case accommodating the electrode assembly; a current collector including an electrode connecting portion located at a region corresponding to an electrode uncoated portion of the electrode uncoated portions and including a coupling groove located in a surface of the electrode connecting portion, and a terminal connecting portion bent from the electrode connecting portion and extending over the electrode assembly; and a sub-tab including a first region coupled to the coupling groove, and a second region bent from the first region and connected to the electrode uncoated portion.

8 Claims, 9 Drawing Sheets

(51) Int. Cl.
*H01M 4/02* (2006.01)
*H01M 50/538* (2021.01)

(56) References Cited

U.S. PATENT DOCUMENTS

| | | | |
|---|---|---|---|
| 9,287,550 | B2 | 3/2016 | Kim et al. |
| 10,727,469 | B2 | 7/2020 | Jang et al. |
| 2010/0247989 | A1 | 9/2010 | Kim |
| 2011/0081568 | A1 | 4/2011 | Kim et al. |
| 2011/0135976 | A1* | 6/2011 | Byun .................. H01M 50/155 429/56 |
| 2013/0330593 | A1 | 12/2013 | Kim et al. |
| 2017/0125778 | A1 | 5/2017 | Iwasa et al. |
| 2019/0067665 | A1* | 2/2019 | Jang .................... H01M 50/172 |
| 2019/0067667 | A1 | 2/2019 | Jang et al. |
| 2019/0067728 | A1 | 2/2019 | Kwak |

FOREIGN PATENT DOCUMENTS

| | | |
|---|---|---|
| CN | 106165152 A | 11/2016 |
| CN | 109428042 A | 3/2019 |
| CN | 109428043 A | 3/2019 |
| CN | 109428045 A | 3/2019 |
| EP | 3451416 A1 | 3/2019 |
| EP | 3451417 A1 | 3/2019 |
| KR | 10-1072956 B1 | 10/2011 |
| KR | 10-1147173 B1 | 5/2012 |
| KR | 10-2019-0024293 A | 3/2019 |

OTHER PUBLICATIONS

China Office Action from corresponding Chinese Application No. 202010156670.8, Chinese Office Action dated Mar. 29, 2022 (7 pgs.), and English translation (7 pgs.).

* cited by examiner

SECONDARY BATTERY

CROSS-REFERENCE TO RELATED APPLICATION

This application claims priority to and the benefit of Korean Patent Application No. 10-2019-0031255, filed on Mar. 19, 2019 in the Korean Intellectual Property Office, the entire content of which is herein incorporated by reference.

BACKGROUND

1. Field

Aspects of embodiments of the present disclosure relate to a secondary battery.

2. Description of the Related Art

Unlike a primary battery that cannot be charged, a secondary battery can be charged and discharged. Low-capacity secondary batteries packaged in the form of a pack including a single battery cell may be used as the power source for various portable small-sized electronic devices, such as cellular phones or camcorders, while a high-capacity secondary battery having several tens to several hundreds of battery cells connected to one another may be used as a power source for motor drives, such as those in hybrid vehicles, electric vehicles, or the like.

The secondary battery may be manufactured in any of various shapes, such as a cylindrical shape and a prismatic shape. Secondary batteries are configured such that an electrode assembly including a positive electrode plate and a negative electrode plate with a separator as an insulator positioned therebetween, and an electrolyte, are housed in a case, and a cap plate is installed on the case. The electrode assembly may be electrically connected to electrode terminals through current collectors. Here, a volume of the case may be dependent according to structures of the current collectors. Therefore, a secondary battery capable of achieving a larger capacity within a limited size may be desired.

SUMMARY

According to an aspect of embodiments of the present disclosure, a secondary battery having an improved exothermic property and an increased capacity of an electrode assembly is provided.

According to one or more embodiments of the present disclosure, a secondary battery includes: an electrode assembly including a first electrode plate and a second electrode plate, and electrode uncoated portions protruding at opposite sides of the electrode assembly, a case accommodating the electrode assembly; a current collector including an electrode connecting portion located at a region corresponding to an electrode uncoated portion of the electrode uncoated portions and including a coupling groove located in a surface of the electrode connecting portion, and a terminal connecting portion bent from the electrode connecting portion and extending over the electrode assembly; and a sub-tab including a first region coupled to the coupling groove, and a second region bent from the first region and connected to the electrode uncoated portion.

The sub-tab may have a thickness equal to a depth of the coupling groove.

The electrode connecting portion may include a first surface facing a side surface of the electrode assembly, the electrode uncoated portion extending from the side surface, and a second surface opposite to the first surface and facing the case, and the coupling groove may be located in the first surface.

The second region of the sub-tab may be bent with the electrode uncoated portion to be coupled to the electrode connecting portion.

The second region of the sub-tab may be in contact with the second surface of the electrode connecting portion.

The electrode uncoated portion may be coupled to the second surface of the electrode connecting portion through the second region of the sub-tab while facing the case.

The coupling groove may be formed by reducing a thickness of a portion of the electrode connecting portion to which the first region of the sub-tab is coupled.

The coupling groove may be formed by increasing a thickness of a region of the electrode connecting portion other than a portion to which the first region of the sub-tab is coupled.

The electrode connecting portion may be asymmetrical toward a side from a side surface of the electrode assembly.

As described above, in a secondary battery according to an embodiment, since a coupling groove coupled to a sub-tab is located in a current collector, an internal space loss can be minimized or reduced, thereby increasing a capacity of the electrode assembly within a same volume.

In addition, since a coupling groove coupled to a sub-tab is located in a current collector with a thickness of the current collector increased, an exothermic property of a secondary battery according to the present disclosure can be improved while minimizing or reducing an internal space loss.

DETAILED DESCRIPTION

Figure 1:
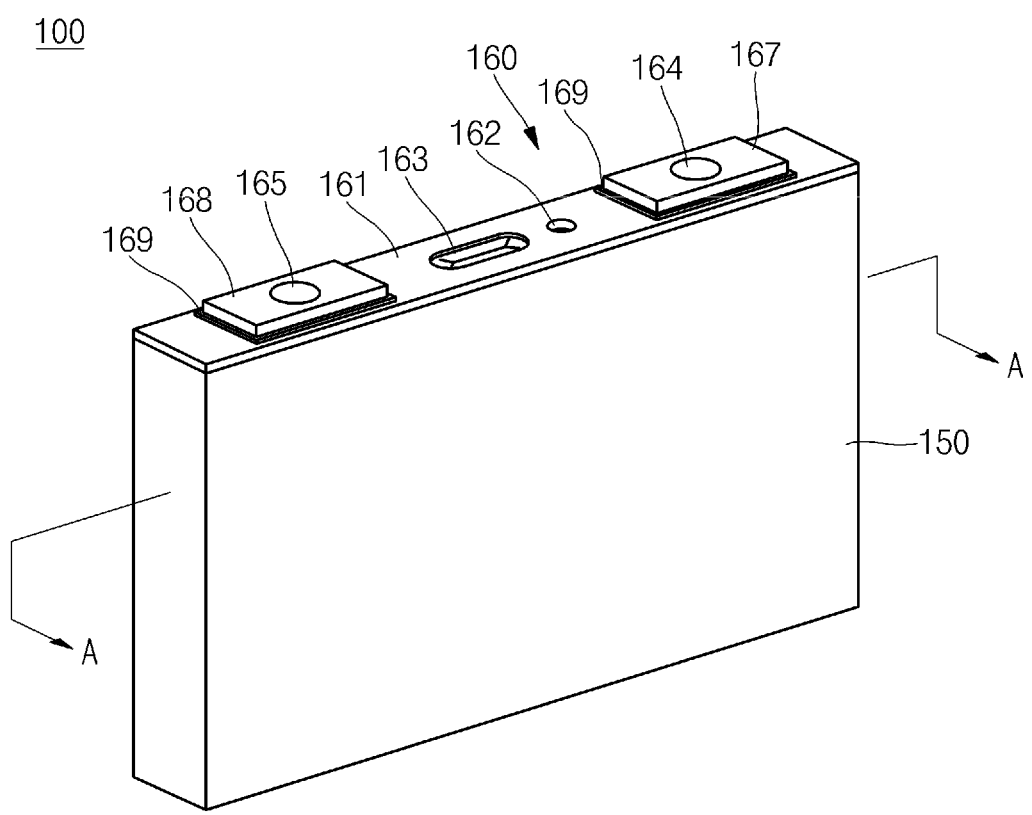
FIG. 1 is a perspective view of a secondary battery according to an embodiment of the present disclosure.

Herein, some example embodiments of the present disclosure will be described in further detail. The subject matter of the present disclosure, however, may be embodied in many different forms and should not be construed as being limited to the example (or exemplary) embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the secondary battery in use or operation in addition to the orientation depicted in the figures. For example, if the secondary battery in the figures is turned over, elements described as "below" or "beneath" other elements or features would then be oriented "on" or "above" the other elements or features. Thus, the exemplary term "below" may encompass both an orientation of above and below.

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

Figure 2:
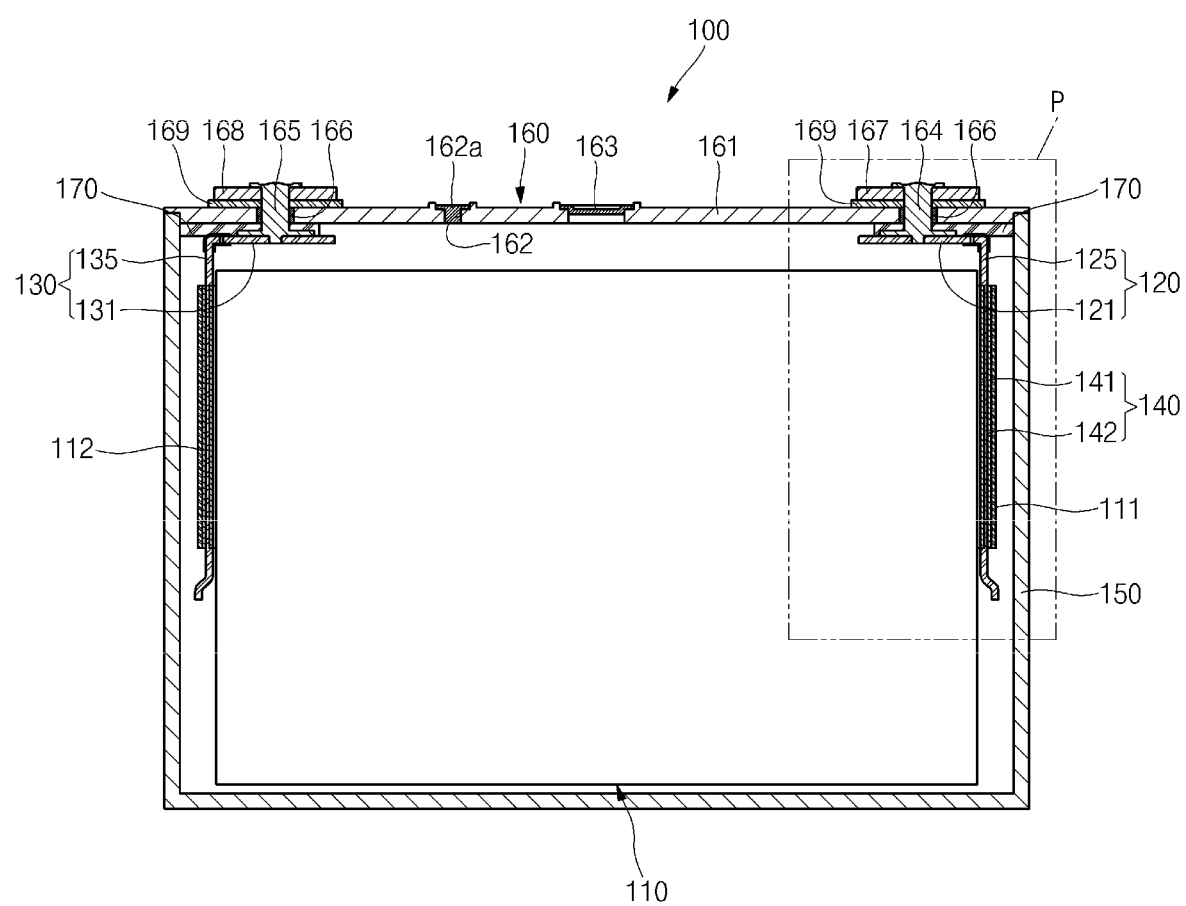
FIG. 2 is a cross-sectional view taken along the line A-A of FIG. 1.
Figure 3:
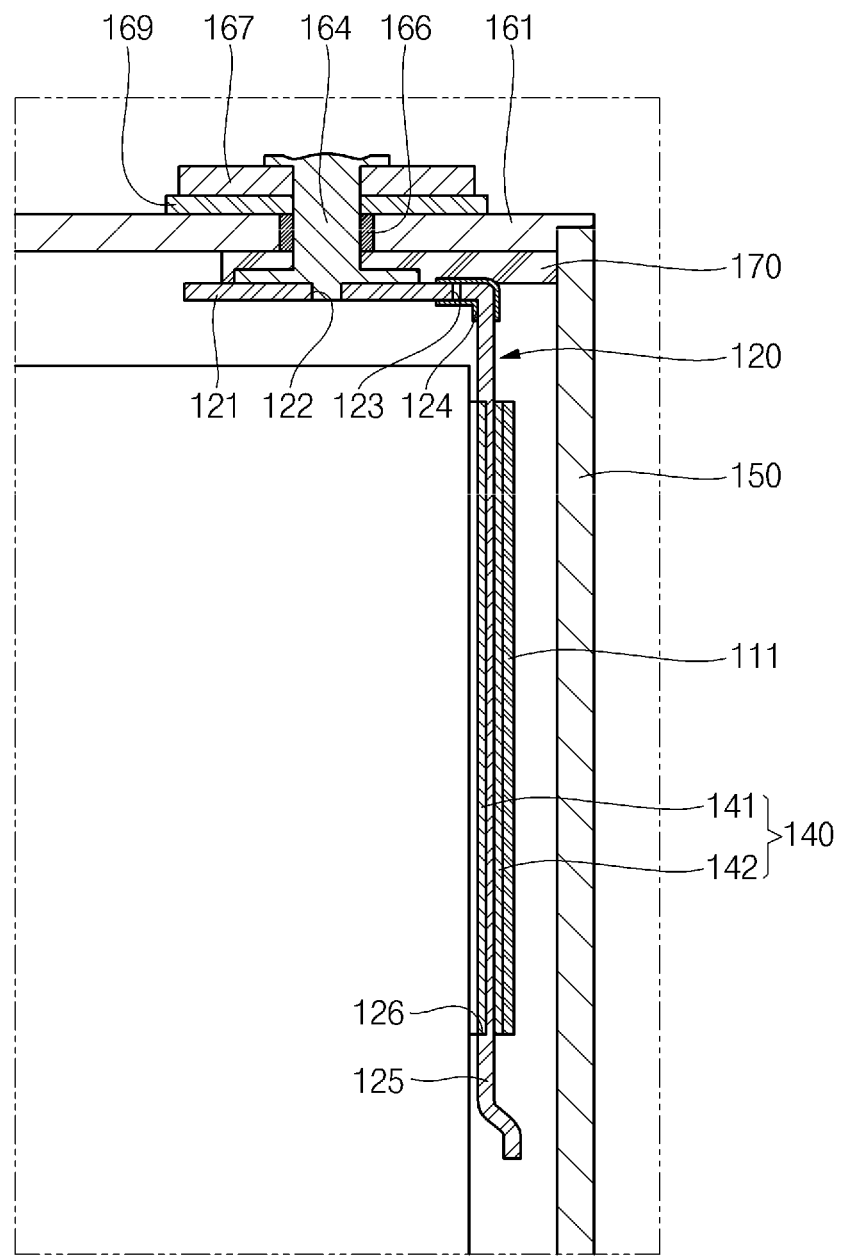
FIG. 3 is an enlarged cross-sectional view of a region "P" of FIG. 2.
Figure 4:
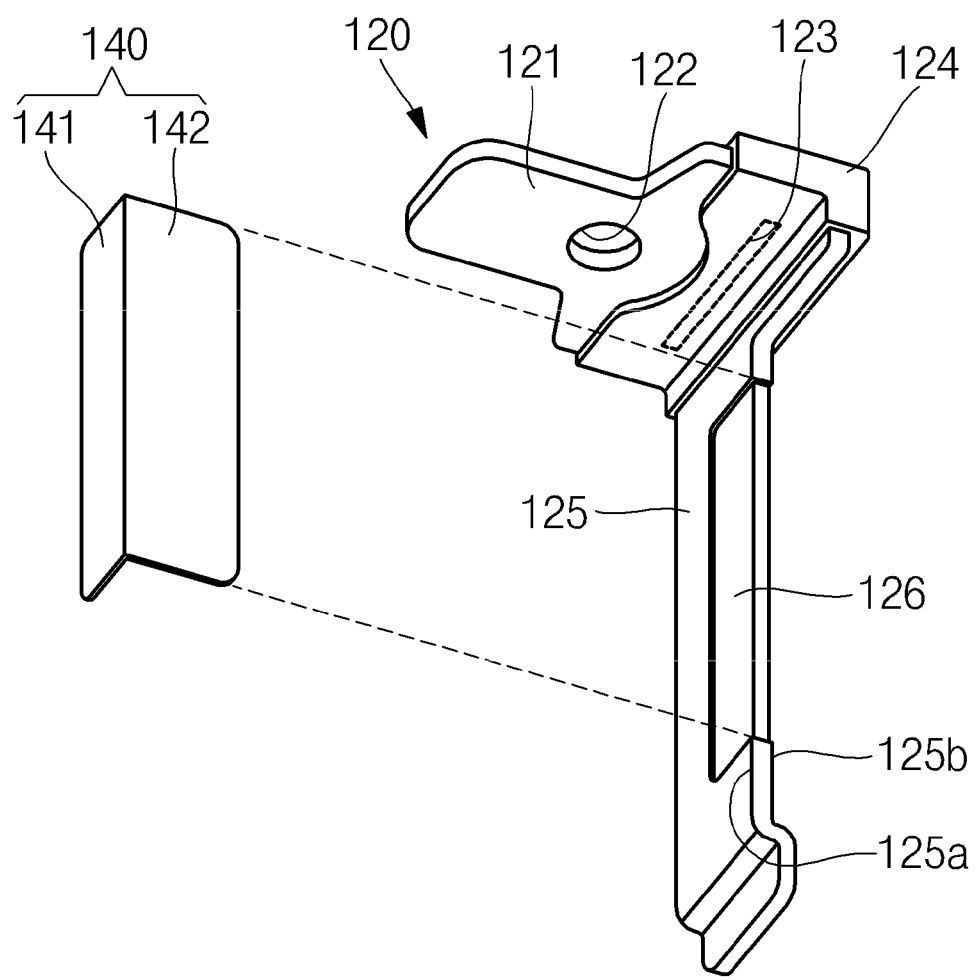
FIG. 4 is an exploded perspective view illustrating a coupling relationship between a current collector and a sub-tab.
Figure 5:
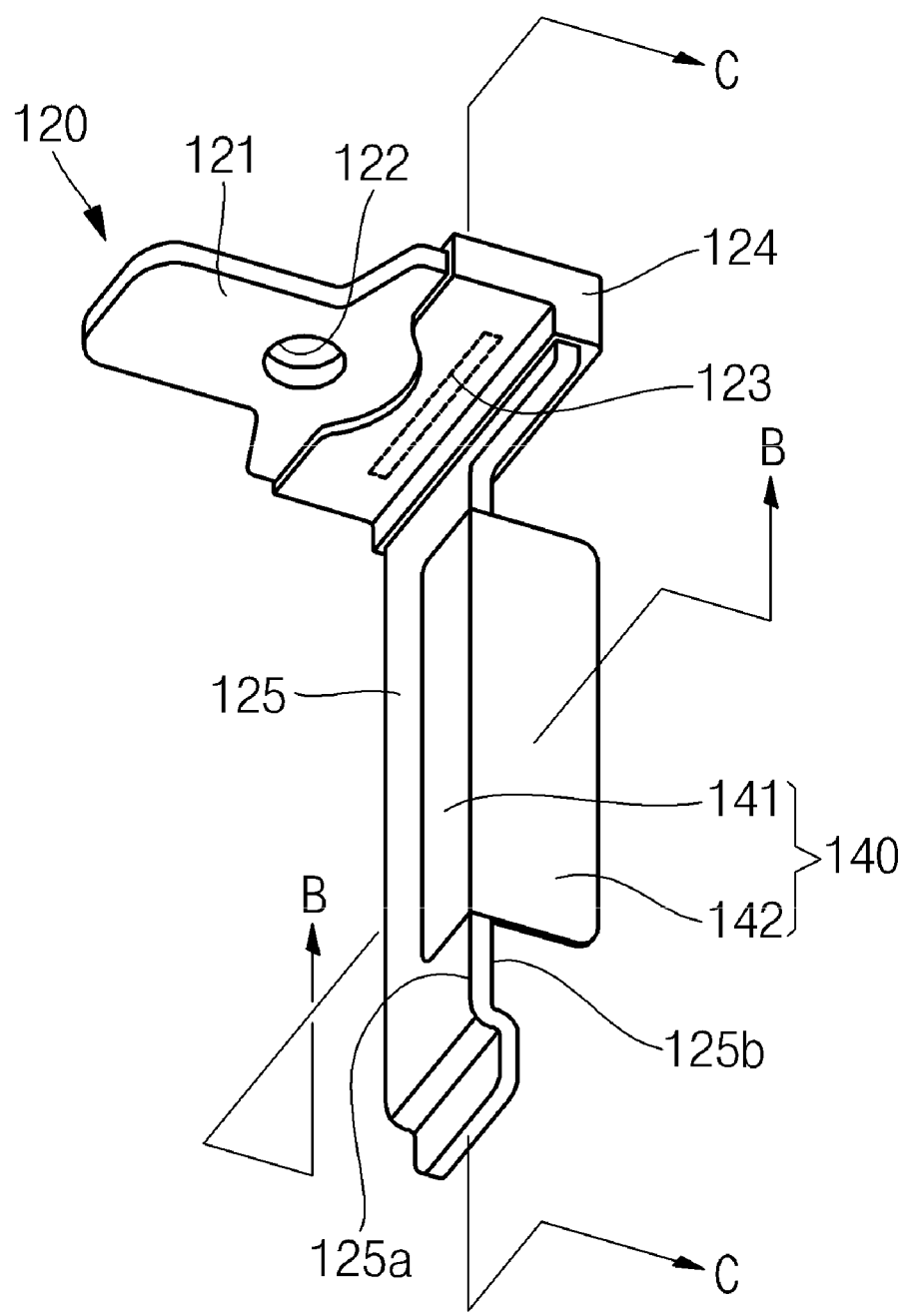
FIG. 5 is a perspective view illustrating a state in which a current collector and a sub-tab are coupled to each other.
Figure 6:
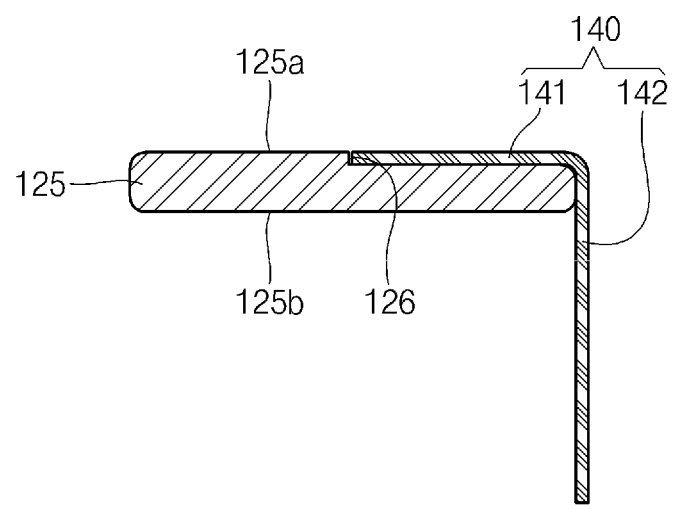
FIG. 6 is a cross-sectional view taken along the line B-B of FIG. 5.
Figure 7:
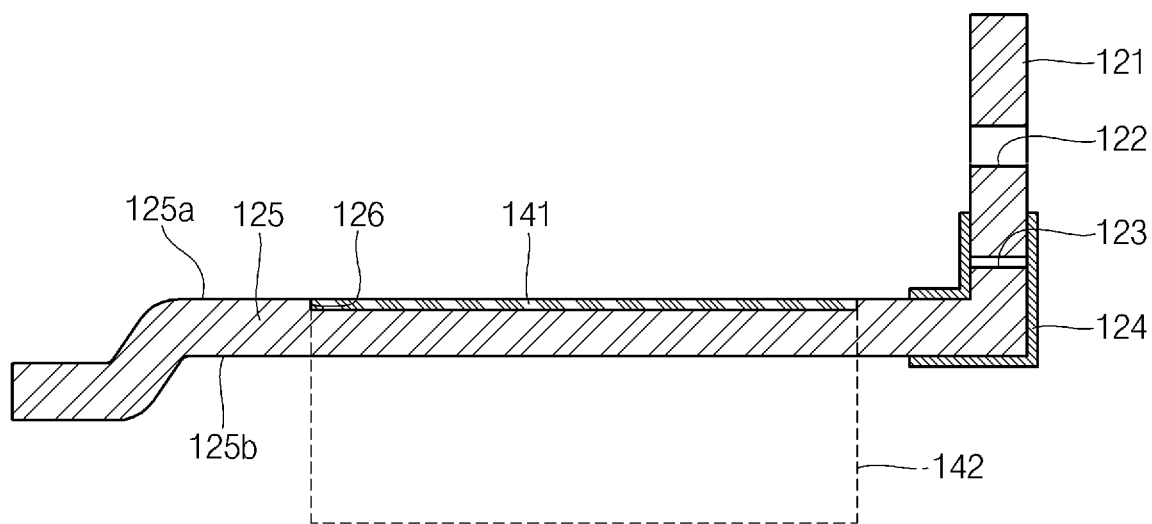
FIG. 7 is a cross-sectional view taken along the line C-C of FIG. 5.
Figure 8:
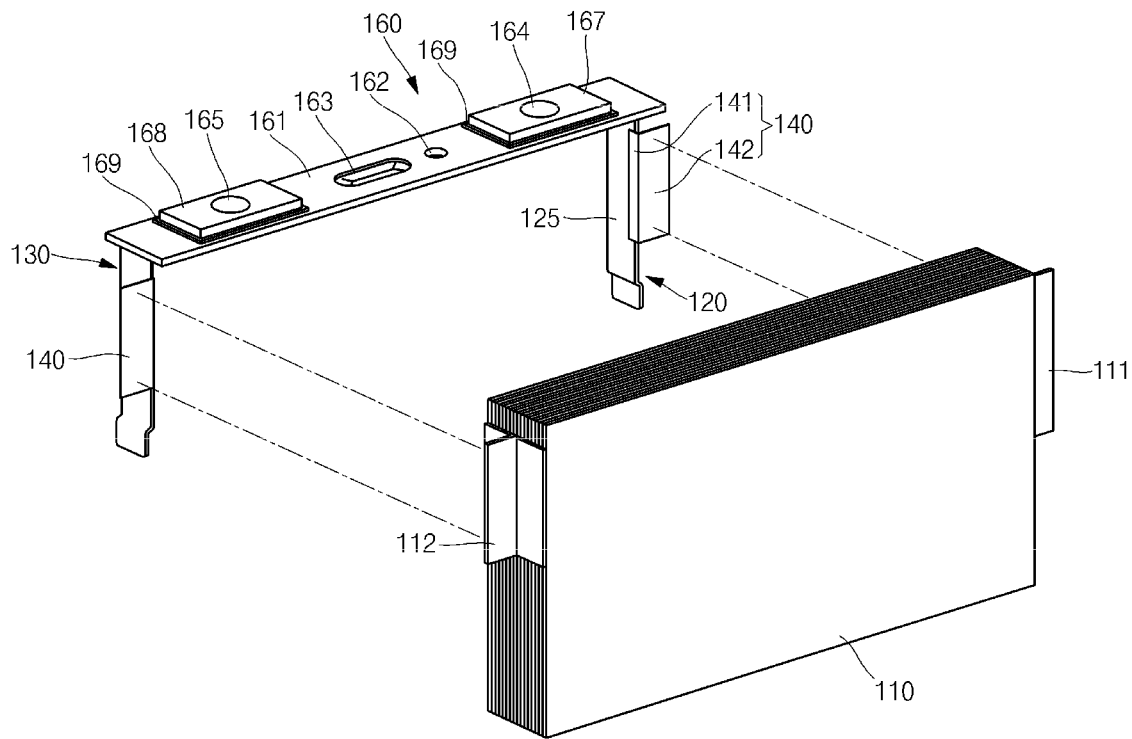
FIGS. 8 and 9 are an exploded perspective view and a perspective view, respectively, illustrating a coupling relationship between an electrode assembly and a current collector.
Figure 9:
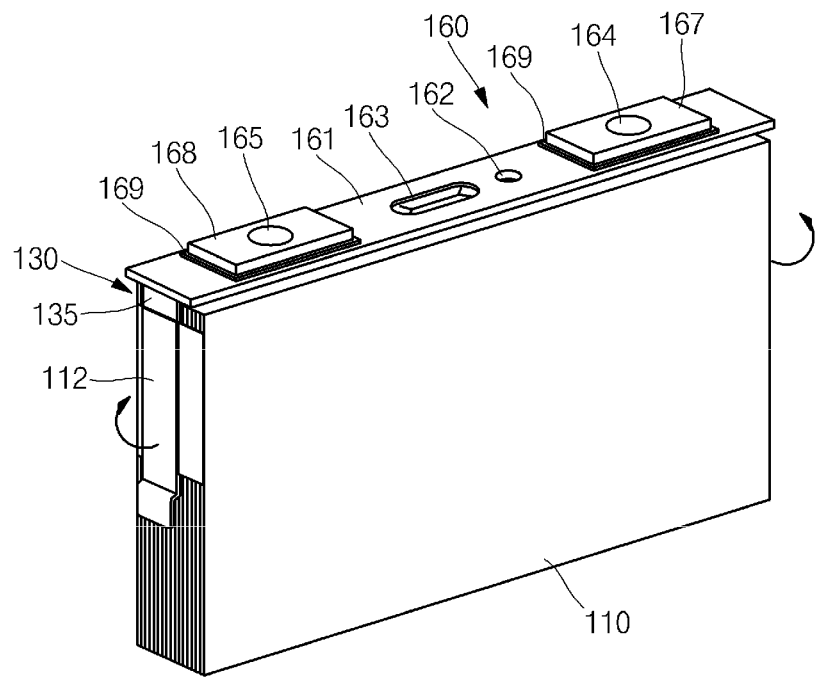
Figure 10:
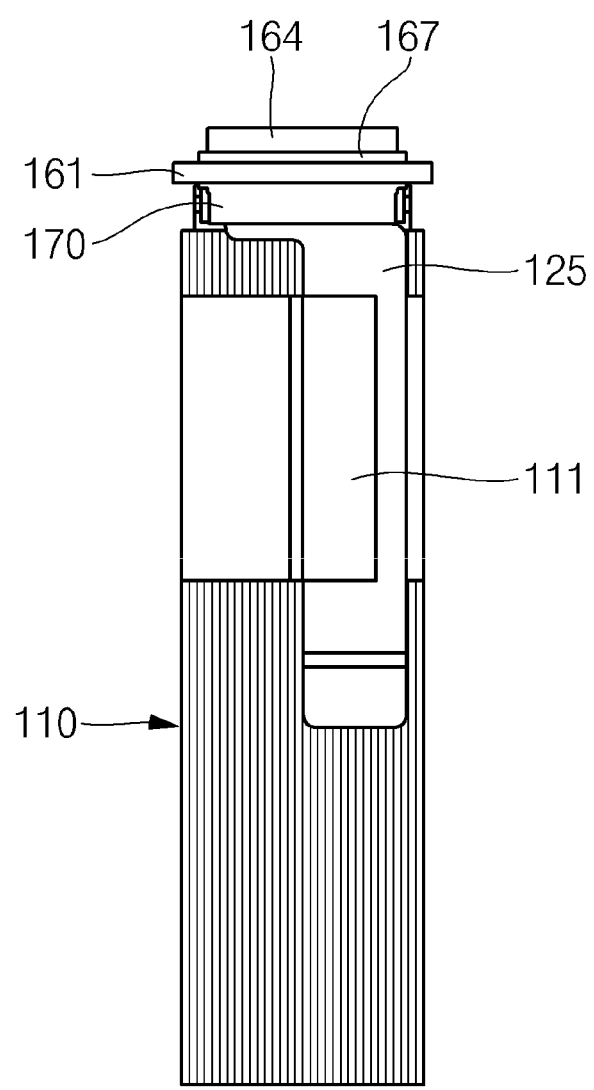
FIG. 10 is a side view illustrating a state in which a current collector is coupled to an electrode assembly.
Figure 11:
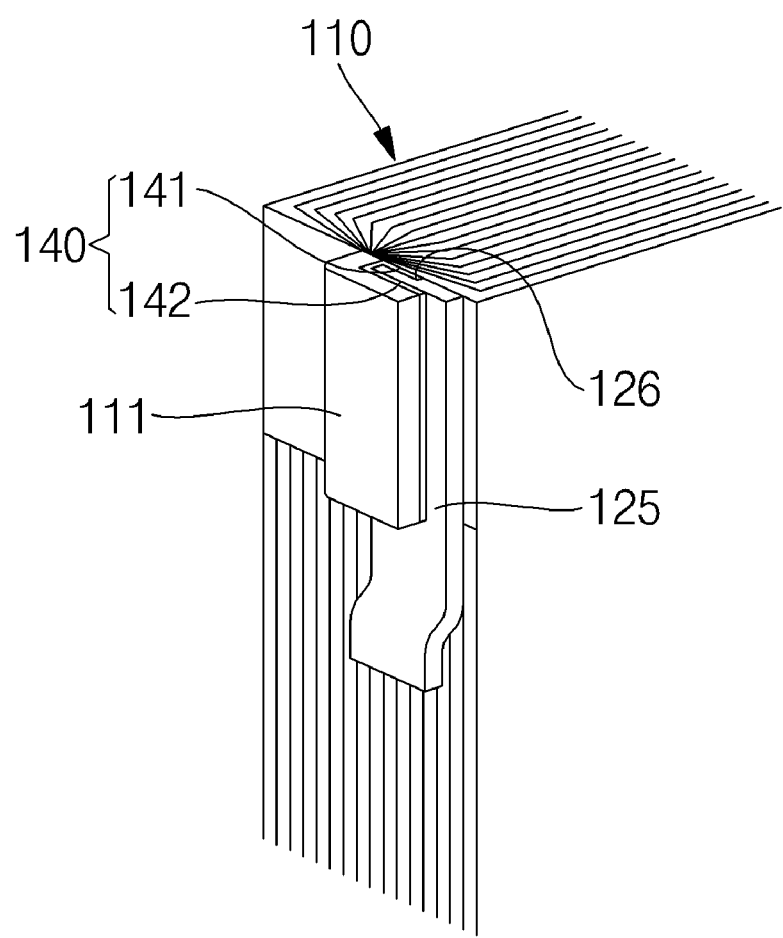
FIG. 11 is an enlarged partial perspective view illustrating a state in which a current collector is coupled to an electrode assembly.

FIG. 1 is a perspective view of a secondary battery according to an embodiment of the present disclosure. FIG. 2 is a cross-sectional view taken along the line A-A of FIG. 1. FIG. 3 is an enlarged cross-sectional view of a region "P" of FIG. 2. FIG. 4 is an exploded perspective view illustrating a coupling relationship between a current collector and a sub-tab. FIG. 5 is a perspective view illustrating a state in which a current collector and a sub-tab are coupled to each other. FIG. 6 is a cross-sectional view taken along the line B-B of FIG. 5. FIG. 7 is a cross-sectional view taken along the line C-C of FIG. 5. FIGS. 8 and 9 are an exploded perspective view and a perspective view, respectively, illustrating a coupling relationship between an electrode assembly and a current collector. FIG. 10 is a side view illustrating a state in which a current collector is coupled to an electrode assembly. FIG. 11 is an enlarged partial perspective view illustrating a state in which a current collector is coupled to an electrode assembly.

Referring first to FIGS. 1 to 3, a secondary battery 100 according to an embodiment includes an electrode assembly 110, current collectors 120 and 130, sub-tabs 140, a case 150, and a cap assembly 160.

The electrode assembly 110 may be produced by stacking a plurality of stacks each including a first electrode plate, a separator, and a second electrode plate, which are thin plates or layers. Here, the first electrode plate may operate as a positive electrode, and the second electrode plate may operate as a negative electrode. Of course, polarities of the first electrode plate and the second electrode plate may be reversed and arranged according to the option of a person of ordinary skill in the art.

In an embodiment, the first electrode plate is formed by coating a first electrode active material, such as a transition metal oxide, on a first electrode current collector formed of a metal foil made of aluminum, for example. The first electrode plate includes a first electrode uncoated portion 111 that is a region without the first electrode active material coated thereon. The first electrode uncoated portion provides a passage of a flow of current between the first electrode plate and an exterior of the first electrode plate.

In an embodiment, the first electrode uncoated portion 111 may be overlapped at a same position when multiple first electrode plates are stacked, forming a multi-tab structure. In an embodiment, the first electrode uncoated portion 111 may protrude to a first side of the electrode assembly 110 and may include a plurality of first electrode uncoated portions 111 welded to one another, forming a first current collector tab. In an embodiment, the first current collector tab 111 is integrally formed with the first electrode plate and is drawn out from each of the stacked first electrode plates, thereby increasing current collecting efficiency of the electrode assembly 110. However, in another embodiment, the first current collector tab 111 may be separately formed from the first electrode plate according to the option of a person skilled in the art.

In an embodiment, the second electrode plate is formed by coating a second electrode active material, such as graphite or carbon, on a second electrode current collector formed of a metal foil made of copper or nickel, for example. The second electrode plate includes a second electrode uncoated portion 112 that is a region without the second electrode active material coated thereon.

In an embodiment, the second electrode uncoated portion 112 may be overlapped at a same position when multiple second electrode plates are stacked, forming a multi-tab structure. In an embodiment, the second electrode uncoated portion 112 may protrude to a second side of the electrode assembly 110 and may include a plurality of second electrode uncoated portions welded to one another, forming a second current collector tab.

The separator may be positioned between the first electrode plate and the second electrode plate to prevent or substantially prevent electrical short circuits and to allow movement of lithium ions. The separator may be made of polyethylene, polypropylene, or a composite film made of polypropylene and polyethylene. However, embodiments of the present disclosure are not limited to the materials of the separator described above.

The electrode assembly 110 is accommodated in the case 150 with an electrolyte. The electrolyte may include a lithium salt, such as $LiPF_6$, or $LiBF_4$, dissolved in an organic solvent, such as ethylene carbonate (EC), propylene carbonate (PC), diethyl carbonate (DEC), ethyl methyl carbonate (EMC), or dimethyl carbonate (DMC). In addition, the electrolyte may be in a liquid, solid, or gel phase.

The current collectors 120 and 130 include a first current collector 120 electrically connected to the first electrode plate and a second current collector 130 electrically connected to the second electrode plate.

The first current collector 120 is made of a conductive material, such as aluminum, and is brought into contact with the first electrode uncoated portion 111 extending to the first side of the electrode assembly 110 to then be electrically connected to the first electrode plate.

Referring to FIGS. 4 to 7, in an embodiment, the first current collector 120 includes a first terminal connecting portion 121 and a first electrode connecting portion 125, and a bent region is located between the first terminal connecting portion 121 and the first electrode connecting portion 125.

In an embodiment, the first terminal connecting portion 121 is positioned above the electrode assembly 110 and is parallel with a cap plate 161, which will later be described. For example, the first terminal connecting portion 121 is positioned between the electrode assembly 110 and the cap plate 161 and may be shaped of a substantially planar plate. In an embodiment, the first terminal connecting portion 121 includes a terminal hole 122 and a fuse hole 123. Here, the fuse hole 123 is located closer to the bent region than the terminal hole 122. A first terminal 164, which will later be described, is coupled to the terminal hole 122. The fuse hole 123 may be shaped as a rectangle, for example, an elongated rectangle perpendicular to, for example, the first terminal connecting portion 121, but embodiments of the present disclosure are not limited thereto. The fuse hole 123 may be shaped to reduce the cross-sectional area of the first terminal connecting portion 121. If a large amount of current flows in the secondary battery 100 due to an electrical short circuit occurring thereto, heat is generated in the secondary battery 100, and a region where the fuse hole 123 is located may be fused and cut by the generated heat, thereby cutting off the flow of current. In an embodiment, a molding member 124 is located at an end of the first terminal connecting portion 121 to cover the fuse hole 123. In an embodiment, the molding member 124 may extend from the first terminal connecting portion 121 to the first electrode connecting portion 125. In an embodiment, the molding member 124 may be formed in the first terminal connecting portion 121 by insert-molding. In addition, the molding member 124 may prevent or substantially prevent an arc from being generated when the region where the fuse hole 123 is located is fused and cut. The molding member 124 may be generally made of an insulating material, such as polypropylene or polyethylene, but is not limited thereto.

The first electrode connecting portion 125 is bent from an end of the first terminal connecting portion 121 to then downwardly extend and is located at a side of the electrode assembly 110. The first electrode uncoated portion 111 is connected to the first electrode connecting portion 125.

Referring to FIGS. 4 to 7, the first electrode connecting portion 125 has a first surface 125a and a second surface 125b opposite to the first surface 125a. The first surface 125a faces the electrode assembly 110, and the second surface 125b faces the case 150. A coupling groove 126 is located in the first surface 125a of the first electrode connecting portion 125. One of the sub-tabs 140 is coupled to the coupling groove 126. The coupling groove 126 may extend in a length direction of the first electrode connecting portion 125. In an embodiment, the coupling groove 126 has a depth equal to a thickness of the sub-tab 140. Therefore, if the sub-tab 140 is coupled to the coupling groove 126, the first surface 125a of the first electrode connecting portion 125 is planarly formed. The coupling groove 126 may be provided by forming a groove at a portion of the first electrode connecting portion 125, to which the sub-tab 140 is coupled (that is, by reducing a thickness of the portion to which the sub-tab 140 is coupled) or by increasing a thickness of a region other than the portion to which the sub-tab 140 is coupled. In the former case, the coupling groove 126 may reduce the thickness of a portion where the first electrode connecting portion 125 and the sub-tab 140 are coupled to each other, thereby minimizing or reducing an internal space loss and ultimately increasing the capacity of the secondary battery 100. In the latter case, the coupling groove 126 may increase the overall thickness of the first electrode connecting portion 125 relative to the same volume and capacity, thereby improving the exothermic property. For example, if an electrical short circuit occurs to the secondary battery 100, a large amount of current may flow in the secondary battery 100 and thus generates heat. As described above, heat conductivity can be reduced by increasing the thickness of the first electrode connecting portion 125, thereby improving the exothermic property.

In an embodiment, the first electrode connecting portion 125 is bent from the end of the first terminal connecting portion 121 to then extend so as to be asymmetrical toward one side (that is, so as to be shifted) in view of a stacking direction of the electrode assembly 110. That is, in an embodiment, the first electrode connecting portion 125 is formed only at one side relative to a central portion of the stacked electrode assembly 110 (e.g., the left or the right in FIG. 9). In this way, if the first electrode connecting portion 125 is shifted toward one side in view of the stacking direction of the stacked electrode assembly 110, the plurality of first electrode uncoated portions 111 may be collected together approximately at a center of the electrode assembly 110 to then be easily connected to the first electrode connecting portion 125. In other words, since the first electrode connecting portion 125 is formed to be shifted toward one side in view of the stacking direction of the electrode assembly 110, the length of the first electrode uncoated portion 111 can be minimized or reduced.

The second current collector 130 is made of a conductive material, such as nickel, and is brought into contact with the second electrode uncoated portion 112 extending to the second side of the electrode assembly 110 to then be electrically connected to the second electrode plate. The second current collector 130 includes a second terminal connecting portion 131 and a second electrode connecting portion 135. Here, a bent region is located between the second terminal connecting portion 131 and the second electrode connecting portion 135. In addition, a second terminal 165 is electrically connected to the second terminal connecting portion 131. In an embodiment, the second current collector 130 has the same configuration as the first current collector 120, and repeated explanations thereof will not be given.

The sub-tabs 140 are electrically coupled to the first electrode connecting portion 125 and the second electrode connecting portion 135, respectively. In an embodiment, the sub-tabs 140 coupled to the first and second electrode connecting portions 125 and 135 may have a same configuration but may be made of different materials. For example, the sub-tab 140 coupled to the first electrode connecting portion 125 may be made of aluminum or an aluminum alloy, and the sub-tab 140 coupled to the second electrode connecting portion 135 may be made of copper or a copper alloy. The following description will be made by way of example with respect to the sub-tab 140 coupled to the first electrode connecting portion 125.

The sub-tab 140 includes a first region 141 coupled to the coupling groove 126 of the first electrode connecting portion 125, and a second region 142 bent from the first region 141. The first region 141 may first be coupled to the coupling groove 126 located in the first surface 125a of the first electrode connecting portion 125 and then fixed to the first electrode connecting portion 125 by welding. In an embodiment, the sub-tab 140 and the first electrode connecting portion 125 may be welded to each other by laser welding, resistance welding, or ultrasonic welding. In an embodiment, the sub-tab 140 has a smaller thickness than the first electrode connecting portion 125 so as to be easily bent in a subsequent process. The second region 142 is bent (e.g., vertically bent) from the first region 141 in an L-shaped configuration. The first electrode uncoated portion 111 of the electrode assembly 110 is welded to the second region 142. In an embodiment, the second region 142 of the sub-tab 140 and the first electrode uncoated portion 111 is bent again to be coupled to the second surface 125b of the first electrode connecting portion 125. Here, the second region 142 is bent to be brought into contact with the second surface 125b of the first electrode connecting portion 125. That is, the first electrode uncoated portion 111 welded to the second region 142 is positioned to face the case 150. Thus, as shown in FIGS. 3 to 11, the first region 141 of the sub-tab 140, the first electrode connecting portion 125, the second region 142 of the sub-tab 140, and the first electrode uncoated portion 111 are arranged in that order between the electrode assembly 110 and the case 150.

Referring to FIGS. 8 and 9, a coupling relationship between the first electrode uncoated portion 111 and the first current collector 120 will now be described according to an embodiment. First, as shown in FIG. 8, the first current collector 120 is coupled to the cap assembly 160, and the first region 141 of the sub-tab 140 is fixed to the coupling groove 126 of the first electrode connecting portion 125 by welding. Then, the second region 142 of the sub-tab 140 is bent perpendicular to the first region 141 to have the generally L-shaped configuration. Of course, the sub-tab 140 may be welded to the coupling groove 126 in a state in which the first region 141 and the second region 142 are positioned perpendicular to each other. Next, the first electrode uncoated portion 111 protruding to the first side of the electrode assembly 110 is welded to the second region 142 of the sub-tab 140. Here, a plurality of first electrode uncoated portions 111 may be welded to one another, forming a single current collector tab.

Next, as shown in FIG. 9, the sub-tab 140 is bent such that the second region 142 of the sub-tab 140 comes into contact with the second surface 125b of the first electrode connecting portion 125. Therefore, the sub-tab 140 may be bent approximately in a U-shaped configuration. In an embodiment, the sub-tab 140 and the first electrode uncoated portion 111 may be fixed to the first electrode connecting portion 125 by welding.

As described above, the sub-tab 140 is coupled to the coupling groove 126 of the first electrode connecting portion 125 so as not to protrude from the first electrode connecting portion 125 to thus minimize or reduce an internal space loss, thereby increasing the capacity of the secondary battery 100.

The case 150 may be made of a conductive metal, such as aluminum, an aluminum alloy, or a nickel-plated steel, and may have a generally hexahedron shape having an opening through which the electrode assembly 110 is inserted and placed in the case 150. The cap plate 161 is coupled to the opening of the case 150 to seal the case 150. In an embodiment, the interior surface of the case 150 is subjected to insulation treatment to prevent or substantially prevent an electrical short circuit from occurring inside the case 150. In addition, according to some embodiments of the present disclosure, an electrode of the electrode assembly 110 may be electrically connected to the case 150 through the cap plate 161. In this case, the insulation treatment of the interior surface of the case 150 may also make it possible to prevent or substantially prevent an internal electrical short circuit. In an embodiment, the case 150 may operate as, for example, a positive electrode.

The cap assembly 160 is coupled to a top portion (opening) of the case 150. In an embodiment, the cap assembly 160 includes the cap plate 161, an electrolyte injection hole 162, a safety vent 163, the first terminal 164, the second terminal 165, a gasket 166, a first terminal plate 167, a second terminal plate 168, a fastening plate 169 and a lower insulation member 170.

The cap plate 161 may seal the opening of the case 150 and may be made of a same material as the case 150. As an example, the cap plate 161 may be coupled to the case 150 by laser welding. In addition, the cap plate 161 may be electrically independent, or may be electrically connected to one of the first current collector 120 and the second current collector 130 in some cases.

In an embodiment, the electrolyte injection hole 162 for injecting an electrolyte is located in the cap plate 161. The electrolyte is injected into the case 150 through the electrolyte injection hole 162, and the electrolyte injection hole 162 is then sealed by a plug 162a.

In an embodiment, the safety vent 163 having a smaller thickness than other regions of the cap plate 161 is located approximately at a center of the cap plate 161. When an internal pressure of the case 150 is higher than a certain pressure (e.g., a preset rupture pressure), the safety vent 163 is ruptured, thereby preventing or substantially preventing the secondary battery 100 according to an embodiment of the present disclosure from exploding.

The first terminal 164 and the second terminal 165 are formed to pass through the cap plate 161, respectively. The first terminal 164 is coupled to the terminal hole 122 of the first terminal connecting portion 121 to then be electrically connected to the first current collector 120. Similarly, the second terminal 165 is coupled to a terminal hole of the second terminal connecting portion 131 to then be electrically connected to the second current collector 130.

The gasket 166 is located between each of the first and second terminals 164 and 165 and the cap plate 161. The gasket 166 is configured to cover the exterior side of each of the first and second terminals 164 and 165 and is made of an insulating material. The gasket 166 seals a gap between each of first and second terminals 164 and 165 and the cap plate 161. The gasket 166 prevents or substantially prevents external moisture from penetrating into the secondary battery 100 and prevents or substantially prevents the electrolyte accommodated in the secondary battery 100 from flowing out.

The first terminal plate 167 is coupled to the first terminal 164 upwardly protruding from the cap plate 161. After the first terminal plate 167 is coupled to the first terminal 164, a top portion of the first terminal 164 may be riveted or a boundary surface between the first terminal plate 167 and the first terminal 164 may be welded to then be fixed to the first terminal 164.

The second terminal plate 168 is coupled to the second terminal 165 upwardly protruding from the cap plate 161. After the second terminal plate 168 is coupled to the second terminal 165, a top portion of the second terminal 165 may be riveted or a boundary surface between the second terminal plate 168 and the second terminal 165 may be welded to then be fixed to the second terminal 165.

The fastening plate 169 is located between the cap plate 161 and the first terminal plate 167 and between the cap plate 161 and the second terminal plate 168. The fastening plate 169 may be made of an electrically conductive material or an insulating material. For example, the fastening plate 169 located under the first terminal plate 167 may be may be made of an electrically conductive material, and the fastening plate 169 located under the second terminal plate 168 may be made of an insulating material. In this case, the first terminal 164 may have the same polarity as the cap plate 161. In addition, if the fastening plate 169 is made of an insulating material, the first terminal 164 and the second terminal 165 may be electrically disconnected from the cap plate 161.

The lower insulation member 170 is located between the first current collector 120 and the cap plate 161 and between the second current collector 130 and the cap plate 161, thereby electrically insulating the first and second current collectors 120 and 130 from the cap plate 161.

In embodiments, since the coupling groove 126 having the sub-tab 140 coupled thereto is formed in the current collector 120, the secondary battery 100 according to the embodiment of the present disclosure can minimize or reduce an internal space loss, thereby increasing the capacity of the electrode assembly 110 within a same volume.

In addition, the secondary battery 100 according to an embodiment of the present disclosure includes the coupling groove 126 formed in the current collector 120, the coupling groove 126 having the sub-tab 140 coupled thereto in such a manner that the thickness of the current collector 120 increases, thereby improving the exothermic property while minimizing or reducing the internal space loss.

While the secondary battery according to the present disclosure has been particularly shown and described with reference to one or more example embodiments thereof, it will be understood by those of ordinary skill in the art that various changes in form and details may be made therein without departing from the spirit and scope of the present disclosure as set forth by the following claims.

What is claimed is:

1. A secondary battery comprising:
   an electrode assembly comprising a first electrode plate and a second electrode plate, and electrode uncoated portions protruding at opposite sides of the electrode assembly;
   a case accommodating the electrode assembly;
   a current collector comprising an electrode connecting portion located at a region corresponding to an electrode uncoated portion of the electrode uncoated portions and comprising a coupling groove in a surface of the electrode connecting portion, and a terminal connecting portion bent from the electrode connecting portion and extending over the electrode assembly; and
   a sub-tab comprising a first region coupled to the coupling groove, and a second region bent from the first region and connected to the electrode uncoated portion,
   wherein the electrode connecting portion comprises a first surface facing a side surface of the electrode assembly, the side surface comprising the electrode uncoated portion extending therefrom, and a second surface opposite to the first surface and facing the case, and the coupling groove is located in the first surface.

2. The secondary battery of claim 1, wherein the sub-tab has a thickness equal to a depth of the coupling groove.

3. The secondary battery of claim 1, wherein the second region of the sub-tab is bent with the electrode uncoated portion to be coupled to the electrode connecting portion.

4. The secondary battery of claim 3, wherein the second region of the sub-tab is in contact with the second surface of the electrode connecting portion.

5. The secondary battery of claim 3, wherein the electrode uncoated portion is coupled to the second surface of the electrode connecting portion through the second region of the sub-tab while facing the case.

6. The secondary battery of claim 1, wherein the coupling groove is formed by reducing a thickness of a portion of the electrode connecting portion to which the first region of the sub-tab is coupled.

7. The secondary battery of claim 1, wherein the coupling groove is formed by increasing a thickness of a region of the electrode connecting portion other than a portion to which the first region of the sub-tab is coupled.

8. The secondary battery of claim 1, wherein the electrode connecting portion is asymmetrical toward a side from a side surface of the electrode assembly.

* * * * *